United States Patent
Nakamura et al.

(10) Patent No.: US 7,834,104 B2
(45) Date of Patent: Nov. 16, 2010

(54) PROCESS FOR PRODUCTION OF URETHANE RESIN AND ADHESIVE AGENT

(75) Inventors: Makito Nakamura, Ibaraki (JP); Hitoshi Shimoma, Ibaraki (JP); Hisashi Sato, Ibaraki (JP); Yasuhito Adachi, Ibaraki (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/189,268

(22) Filed: Aug. 11, 2008

(65) Prior Publication Data

US 2008/0312386 A1 Dec. 18, 2008

Related U.S. Application Data

(63) Continuation of application No. PCT/JP2007/052248, filed on Feb. 8, 2007.

(30) Foreign Application Priority Data

Feb. 10, 2006 (JP) ............................. 2006-033907

(51) Int. Cl.
*C08G 18/10* (2006.01)
*C08G 18/32* (2006.01)
*C08G 18/38* (2006.01)
*C08G 18/66* (2006.01)

(52) U.S. Cl. ....................... 525/453; 525/460

(58) Field of Classification Search ................. 525/457, 525/453, 460

See application file for complete search history.

(56) References Cited

U.S. PATENT DOCUMENTS

| | | | | |
|---|---|---|---|---|
| 3,192,186 A | * | 6/1965 | Schmidt et al. | 528/65 |
| 3,437,622 A | * | 4/1969 | Dahl | 524/270 |
| 3,520,835 A | * | 7/1970 | Fenton et al. | 521/112 |
| 3,718,712 A | * | 2/1973 | Tushaus | 525/458 |
| 3,767,040 A | * | 10/1973 | Tushaus | 428/352 |
| 4,368,238 A | * | 1/1983 | Somezawa et al. | 428/413 |
| 4,400,498 A | * | 8/1983 | Konishi et al. | 528/60 |
| 4,681,903 A | * | 7/1987 | Haas et al. | 521/167 |
| 5,115,071 A | * | 5/1992 | Quay et al. | 528/59 |
| 5,591,820 A | * | 1/1997 | Kydonieus et al. | 528/76 |
| 5,656,701 A | * | 8/1997 | Miyamoto et al. | 525/453 |
| 5,929,167 A | * | 7/1999 | Gerard et al. | 525/123 |
| 6,984,709 B2 | * | 1/2006 | Meltzer et al. | 528/76 |
| 7,495,059 B2 | * | 2/2009 | Schumann et al. | 525/453 |
| 2009/0203797 A1 | * | 8/2009 | Kawahara et al. | 514/649 |

FOREIGN PATENT DOCUMENTS

| | | | |
|---|---|---|---|
| GB | 1091604 A | * | 4/1970 |
| JP | 5-98211 | | 4/1993 |
| JP | 2003-012751 | | 1/2003 |
| JP | 2003-221570 | | 8/2003 |
| JP | 2003-252948 | | 9/2003 |
| WO | 2006-035828 | | 4/2006 |

OTHER PUBLICATIONS

Machine Translation of Shigemori et al (JP 2003-012751 A).*
U.S. Appl. No. 11/730,325, filed Mar. 30, 2007, Shimoma, et al.

* cited by examiner

*Primary Examiner*—Randy Gulakowski
*Assistant Examiner*—Mike Dollinger
(74) *Attorney, Agent, or Firm*—Oblon, Spivak, McClelland, Maier & Neustadt, L.L.P.

(57) ABSTRACT

An object of the invention is to provide a process for urethane resin production in which the molecular weight of the urethane resin can be easily controlled regardless of the kind of polyisocyanate compound and which can yield a urethane resin for use as a removable pressure-sensitive adhesive usable in extensive applications ranging from a strong-tack region to a slight-tack region. The process for urethane resin production of the invention is a process for producing a urethane resin which comprises reacting a polyol with a first polyisocyanate compound in such a proportion that isocyanate groups are present in excess to thereby obtain an isocyanate-group-terminated prepolymer, subsequently reacting the isocyanate-group-terminated prepolymer with a chain extender, and further reacting the resultant polymer with a chain terminator, wherein the chain extender comprises a polyfunctional compound (X) having three or more functional groups reactive with an isocyanate group, wherein two of the functional groups of the polyfunctional compound (X) are primary hydroxyl groups and the remaining functional group(s) is secondary hydroxyl or tertiary hydroxyl group(s).

10 Claims, No Drawings

PROCESS FOR PRODUCTION OF URETHANE RESIN AND ADHESIVE AGENT

TECHNICAL FIELD

The present invention relates to a process for producing a urethane resin for use as a raw material for pressure-sensitive adhesives. The invention further relates to urethane-resin-based pressure-sensitive adhesives.

BACKGROUND ART

Acrylic pressure-sensitive adhesives and rubber-based pressure-sensitive adhesives are widely known as pressure-sensitive adhesives. Especially recently, acrylic pressure-sensitive adhesives tend to be used in extensive applications ranging from strong-tack pressure-sensitive adhesives having high adhesive force to slight-tack pressure-sensitive adhesives having low adhesive force for use in, e.g., protective films for motor vehicles and electronic materials. However, acrylic pressure-sensitive adhesives have posed problems concerning odor and skin irritation when acrylic monomers remain in the pressure-sensitive adhesives. Furthermore, a removable acrylic pressure-sensitive adhesive is, with the lapse of time after application to an adherend, apt to increase in adhesive force or come to have enhanced migration property, thereby causing an adhesive deposit on the adherend. There have hence been cases where removability becomes insufficient. In addition, a substrate coated with an acrylic pressure-sensitive adhesive has poor followability to adherends. Because of this, when the adherend shape is changed, there are cases where the coated substrate cannot follow the adherend change and peels off or breaks. In rubber-based pressure-sensitive adhesives, the addition of a low-molecular weight plasticizer is indispensable for handleability and for controlling pressure-sensitive adhesiveness, and there has been a problem that the low-molecular weight plasticizer migrates to the surface with the lapse of a prolonged time period to cause a considerable decrease in performance.

In view of the problem, urethane-resin-based pressure-sensitive adhesives obtained by reacting a urethane resin as a main ingredient with a polyisocyanate compound as a crosslinker have been proposed. Examples of the urethane resin serving as a main ingredient which have been proposed include one obtained by reacting a polyol with a polyisocyanate to obtain an isocyanate-terminated urethane prepolymer (isocyanate-group-terminated prepolymer) and reacting this prepolymer with a chain extender having three or more functional groups reactive with an isocyanate group (see patent document 1). The functional groups of the chain extender in patent document 1 can be primary and secondary amino groups and primary, secondary and tertiary hydroxyl groups. Of these functional groups, the primary and secondary amino groups and the primary hydroxyl group are used for the reaction with the isocyanate-terminated urethane prepolymer and react with molecular ends of the isocyanate-terminated prepolymer to connect molecules of the urethane prepolymer to each other. The remaining secondary and/or tertiary hydroxyl group remains in the urethane resin and is used for reaction with the polyisocyanate compound as a crosslinker. With this urethane resin, the adhesive force and cohesive force of a pressure-sensitive adhesive can be controlled in accordance with the reaction amount of the residual secondary hydroxyl groups or tertiary hydroxyl groups with the crosslinker.

Patent Document 1: JP-A-2003-12751

DISCLOSURE OF THE INVENTION

Problems that the Invention is to Solve

However, there have been cases where in the production of a urethane resin with a chain extender described in patent document 1, in particular, with a chain extender having a secondary amino group and a primary amino group, this chain extender poses a problem concerning catalysis in the urethane formation reaction. Namely, there have been cases where due to the catalysis of the amino groups of the chain extender in the urethane formation reaction, even the secondary and tertiary hydroxyl groups, which have lower activity, of the chain extender are also reacted in the chain extension reaction. Because of this, gelation tends to occur, thereby readily causing a problem, for example, that insoluble ingredients generate during the production. Furthermore, use of that chain extender results in an increased viscosity and, hence, it has been difficult to secure coating thickness uniformity and surface smoothness in applying the resultant pressure-sensitive adhesive. To solve this problem, when a solvent is added in a large amount to attain a usable viscosity, this results in problems such as: causing coating failures, e.g., dripping upon application; making it difficult to form a thick coating; requiring a prolonged drying time; and causing foaming.

When the reaction is retarded by, e.g., lowering the reaction temperature in order to inhibit the gelation, the chain extension reaction becomes hard to proceed. As a result, the urethane resin has an insufficiently increased molecular weight.

Especially when a polyisocyanate selected from aliphatic polyisocyanates, alicyclic polyisocyanates, and polyisocyanates having an aromatic ring and having isocyanate groups not directly bonded to the aromatic ring, which are non-yellowing type polyisocyanates suitable for obtaining pressure-sensitive adhesives for optical parts, is used as the polyisocyanate as a raw material for a prepolymer, then control of the chain extension reaction becomes further difficult. It has hence been difficult to obtain a urethane resin having a desired molecular weight (in particular, a high molecular weight) while inhibiting gelation.

As described above, it has been difficult to obtain a pressure-sensitive adhesive having desired performances from the urethane resin described in patent document 1 because molecular-weight control is difficult.

In addition, in the process for urethane resin production described in patent document 1, the secondary and tertiary hydroxyl groups also are apt to undesirably react in the stage of chain extension. It is therefore difficult to secure a sufficient amount of hydroxyl groups available for reaction with a crosslinker after the chain extension reaction of the prepolymer. As a result, cohesive-force control becomes difficult and this makes removability control difficult. There has hence been a drawback that removability is obtained only in medium-tack and lower-tack regions.

An object of the invention, which has been achieved in view of those problems, is to provide a process for urethane resin production in which a chain extension reaction can be easily controlled regardless of the kind of a polyisocyanate compound as a raw material for a prepolymer.

Another object of the invention is to provide a pressure-sensitive adhesive which has a controlled molecular weight regardless of the kind of the polyisocyanate compound used as a raw material for a prepolymer and can have removability even when the adhesive is, in particular, of the strong-tack type.

Means for Solving the Problems

The invention includes the following constitutions.

<1> A process for producing a urethane resin for pressure-sensitive adhesives which comprises reacting a polyol with a polyisocyanate compound in such a proportion that isocyanate groups are present in excess to thereby obtain an isocyanate-group-terminated prepolymer, subsequently reacting the isocyanate-group-terminated prepolymer with a chain extender, and further reacting the resultant polymer with a chain terminator according to need, wherein the chain extender comprises a polyfunctional compound (X) having three or more functional groups reactive with an isocyanate group, wherein two of the functional groups of the polyfunctional compound (X) are primary hydroxyl groups and the remaining functional group(s) is secondary hydroxyl or tertiary hydroxyl group(s).

<2> The process for producing a urethane resin for pressure-sensitive adhesives according to <1> wherein the polyol comprises a polyoxyalkylene polyol having an average number of hydroxyl groups of 2 or larger and having a hydroxyl value of 5.6-600 mg-KOH/g.

<3> The process for producing a urethane resin for pressure-sensitive adhesives according to <1> or <2> wherein the polyfunctional compound (X) is at least one member selected from the group consisting of compounds represented by chemical formula (1) and compounds represented by chemical formula (2):

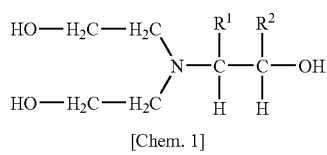

[Chem. 1]

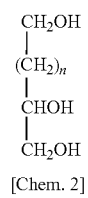

[Chem. 2]

wherein $R^1$ in chemical formula (1) represents a hydrogen atom or a methyl group and $R^2$ therein represents a methyl group or an ethyl group; and n in chemical formula (2) represents any of 0, 1, and 2.

<4> The process for producing a urethane resin for pressure-sensitive adhesives according to any one of <1> to <3> wherein the polyisocyanate compound is one or more polyisocyanates selected from the group consisting of aliphatic polyisocyanates, alicyclic polyisocyanates, and polyisocyanates having an aromatic ring and having isocyanate groups not directly bonded to the aromatic ring.

<5> The process for producing a urethane resin for pressure-sensitive adhesives according to <4> wherein the polyisocyanate compound is one or more polyisocyanate compounds selected from the group consisting of hexamethylene diisocyanate, 3-isocyanatomethyl-3,5,5-trimethylcyclohexyl isocyanate, p-tetramethylxylylene diisocyanate, and m-tetramethylxylylene diisocyanate.

<6> A pressure-sensitive adhesive which comprises a urethane resin obtained by the process for producing a urethane resin for pressure-sensitive adhesives according to any one of <1> to <5>.

<7> A pressure-sensitive adhesive which comprises a crosslinked urethane resin obtained by reacting a urethane resin obtained by the process for producing a urethane resin for pressure-sensitive adhesives according to any one of <1> to <5> with a second polyisocyanate compound.

<8> The pressure-sensitive adhesive according to <6> or <7> wherein the second polyisocyanate compound is one or more polyisocyanates selected from the group consisting of aliphatic polyisocyanates, alicyclic polyisocyanates, and polyisocyanates having an aromatic ring and having isocyanate groups not directly bonded to the aromatic ring.

<9> The pressure-sensitive adhesive according to <6> or <7> which has an adhesive force exceeding 15 N/25 mm.

ADVANTAGES OF THE INVENTION

According to the process of the invention for producing a urethane resin for pressure-sensitive adhesives, a chain extension reaction can be easily controlled regardless of the kind of a polyisocyanate compound as a raw material for a prepolymer.

The urethane resin obtained by the process for urethane resin production of the invention has a controlled molecular weight regardless of the kind of the polyisocyanate compound used as a raw material for a prepolymer. This urethane resin is excellent not only when used alone but also when used as a main ingredient to be reacted with a crosslinker.

The pressure-sensitive adhesives of the invention include one which contains a crosslinked urethane resin obtained by reacting hydroxyl groups remaining in the urethane resin with a second polyisocyanate compound as a crosslinker. This pressure-sensitive adhesive has a controlled molecular weight regardless of the kind of the polyisocyanate compound used as a raw material for a prepolymer and can have desired performances. In particular, even when this pressure-sensitive adhesive is of the strong-tack type, it can have removability. In particular, since the reaction between the urethane resin and the crosslinker is controlled, the pressure-sensitive adhesive especially has suitably adjusted adhesive force and cohesive force.

BEST MODE FOR CARRYING OUT THE INVENTION (Process for Producing Urethane Resin)

The process for urethane resin production of the invention is a process in which a polyol is reacted with a polyisocyanate compound (hereinafter referred to as "first polyisocyanate compound") in such a proportion that isocyanate groups are present in excess to thereby produce an isocyanate-group-terminated prepolymer (prepolymer formation reaction), and this isocyanate-group-terminated prepolymer is reacted with a chain extender (chain extension reaction). Furthermore, the resultant polymer may be reacted with a chain terminator to deactivate the ends (termination reaction) to produce a urethane resin. The urethane resin obtained by this process is mainly for use as a raw material for a main ingredient for urethane-resin-based pressure-sensitive adhesives.

[Polyol]

Examples of the polyol include a polyoxyalkylene polyol, polyester polyol, polyoxytetramethylene glycol, and polycarbonate polyol. Among these polyols, a polyoxyalkylene polyol is preferred from the standpoint of obtaining flexibility.

The polyoxyalkylene polyol can be produced by subjecting an alkylene oxide to ring-opening addition in the presence of a ring-opening polymerization catalyst and a polyvalent initiator.

The alkylene oxide is preferably an alkylene oxide having 2-6 carbon atoms. Examples thereof include ethylene oxide, propylene oxide, 1,2-butylene oxide, and 2,3-butylene oxide. Especially preferred of these are ethylene oxide, propylene oxide, and combinations of these.

Examples of the ring-opening polymerization catalyst include alkali metal compound catalysts for common use, such as potassium hydroxide (KOH) and sodium hydroxide (NaOH); cesium metal compound catalysts such as cesium hydroxide; composite metal cyanide complex catalysts such as zinc hexacyanocobaltate complex; and phosphazene catalysts.

Examples of the polyvalent initiator include compounds having two or more active hydrogen atoms with which the alkylene oxide can react. Specific examples thereof include polyhydric alcohols, polyhydric phenols, polyamines, and alkanolamines. The valence thereof (number of active hydrogen atoms) is preferably 2-6, more preferably 2-3, most preferably 2. Examples of the initiator having a valence of 2 include ethylene glycol, diethylene glycol, propylene glycol, dipropylene glycol, neopentyl glycol, 1,4-butanediol, 1,6-hexanediol, bisphenol A, and relatively low-molecular weight polyoxyalkylene polyols formed by adding a small amount of an alkylene oxide to these compounds. In the case where a composite metal cyanide complex catalyst is used as the ring-opening polymerization catalyst, it is preferred to use a polyoxyalkylene polyol having a molecular weight per hydroxyl group of 200-500 as a polyvalent initiator. One polyvalent initiator may be used alone, or a combination of two or more polyvalent initiators may be used.

The polyoxyalkylene polyol has an average number of hydroxyl groups of 2 or larger, preferably 2-6, more preferably 2-3, most preferably 2. In addition, the number of hydroxyl groups per molecule in a polyoxyalkylene polyol is considered to be equal to the valence (number of active hydrogen atoms) of the polyvalent initiator used for production.

The polyoxyalkylene polyol preferably has a hydroxyl value of 5.6-600 mg-KOH/g. In case where the hydroxyl value thereof is lower than 5.6 mg-KOH/g, this polyoxyalkylene polyol has a high molecular weight and is hence less apt to react with the polyisocyanate compound. In addition, the prepolymer obtained from such a polyoxyalkylene polyol tends to be less reactive with a chain extender. On the other hand, in case where the hydroxyl value thereof exceeds 600 mg-KOH/g, this polyoxyalkylene polyol gives a prepolymer which has a relatively high isocyanate compound proportion and this isocyanate-group-terminated prepolymer is apt to gel when reacted with a chain extender.

The hydroxyl value of the polyoxyalkylene polyol can be suitably selected from that range according to the adhesive force of the pressure-sensitive adhesive to be finally obtained. In the case where a pressure-sensitive adhesive having an adhesive force which exceeds 1 N/25 mm (not lower than those in a low-tack region) and is not higher than 50 N/25 mm (not higher than those in a strong-tack region) is to be obtained, the hydroxyl value of the polyoxyalkylene polyol is preferably 5.6-450 mg-KOH/g, more preferably 11-280 mg-KOH/g, most preferably 18-160 mg-KOH/g.

In the case where a pressure-sensitive adhesive having an adhesive force of 1 N/25 mm or lower (in a slight-tack region) is to be obtained, the hydroxyl value of the polyoxyalkylene polyol is preferably higher than 18 mg-KOH/g, more preferably 37-600 mg-KOH/g, most preferably 56-300 mg-KOH/g.

A mixture of two or more polyoxyalkylene polyols may also be used. In this case, it is preferred that the average hydroxyl value thereof should be within that range.

The polyoxyalkylene polyol has a degree of unsaturation of preferably 0.3 meq/g or lower, more preferably 0.05 meq/g or lower. So long as the degree of unsaturation of the polyoxyalkylene polyol is 0.3 meq/g or lower, the pressure-sensitive adhesive to be obtained is reduced in migration component therefrom.

For producing a polyoxyalkylene polyol having such a low degree of unsaturation, it is preferred to use a cesium metal compound catalyst, composite metal cyanide complex catalyst, or phosphazene catalyst as a ring-opening polymerization catalyst. It is most preferred to use a composite metal cyanide complex catalyst.

A mixture of two or more polyoxyalkylene polyols may be used. In this case also, it is preferred that the average degree of unsaturation and average hydroxyl value thereof should be within the ranges shown above.

As the polyester polyol, a known polyester polyol can be used. Examples thereof include polyester polyols obtained by the condensation reaction of a low-molecular weight diol component with a dibasic acid component. Examples of the low-molecular weight diol include ethylene glycol, propylene glycol, dipropylene glycol, diethylene glycol, triethylene glycol, butylene glycol, 1,6-hexanediol, 3-methyl-1,5-pentanediol, 3,3'-dimethylolheptane, polyoxyethylene glycol, polyoxypropylene glycol, 1,3-butanediol, 1,4-butanediol, neopentyl glycol, octanediol, butylethylpentanediol, 2-ethyl-1,3-hexanediol, cyclohexanediol, and bisphenol A. Glycerol, trimethylolpropane, pentaerythritol, or the like may be used in combination with such low-molecular weight diols. Examples of the dibasic acid component include aliphatic dibasic acids or aromatic dibasic acids, such as terephthalic acid, adipic acid, azelaic acid, sebacic acid, phthalic anhydride, and isophthalic acid.

Also usable are polyester polyols obtained by the ring-opening polymerization of cyclic ester compounds, e.g., lactones, such as poly(ε-caprolactone), poly(β-methyl-γ-valerolactone), and polyvalerolactone.

The polyester polyol has a hydroxyl value of preferably 20-600 mg-KOH/g, more preferably 30-300 mg-KOH/g.

A mixture of two or more polyester polyols may also be used. In this case, it is preferred that the average hydroxyl value thereof should be within that range.

In the case where a combination of a polyoxyalkylene polyol and a polyester polyol is used as polyols, the proportion of one polyol is preferably controlled to 10% by mass or lower, more preferably 5% by mass or lower, based on the sum of both because the two polyols differ in reactivity and gellation is apt to occur or the reaction solution tends to become cloudy. It is more preferred that a polyoxyalkylene polyol and a polyester polyol should not be used in combination. Incidentally, in case where the reaction solution gets cloudy, a colorless and transparent resin is not obtained.

Examples of the polycarbonate polyol include ones produced by reacting phosgene or a carbonate compound such as a dialkyl carbonate or diaryl carbonate with a diol compound.

Examples of the diol compound for use in producing the polycarbonate polyol include ethylene glycol, 1,2-propanediol, 1,3-propanediol, 2-methyl-1,3-butanediol, 1,4-butanediol, neopentyl glycol, 1,5-pentanediol, 2-methyl-1,5-pentanediol, 3-methyl-1,5-pentanediol, 1,6-hexanediol, 2,2,4-trimethyl-1,6-hexanediol, 3,3,5-trimethyl-1,6-hexanediol, 2,3,5-trimethylpentanediol, 1,9-nonanediol, 2-methyl-1,8-octanediol, decanediol, and dodecanediol. These diol components may be used singly or in combination of two or more thereof.

As the polyoxytetramethylene polyol, use can be made of a commercial polyoxytetramethylene glycol.

[First Polyisocyanate Compound]

As the first polyisocyanate compound, known aromatic polyisocyanates, aliphatic polyisocyanates, alicyclic polyisocyanates, or the like can be used.

Examples of the aromatic polyisocyanate include polyisocyanates having an aromatic ring and having an isocyanate group directly bonded to the aromatic ring(s). Specific examples thereof include 1,3-phenylene diisocyanate, 1,4-phenylene diisocyanate, 4,4'-diphenylmethane diisocyanate (hereinafter referred to as MDI), 2,4-tolylene diisocyanate (hereinafter referred to as 2,4-TDI), 2,6-tolylene diisocyanate (hereinafter referred to as 2,6-TDI), 4,4'-toluidine diisocyanate, 2,4,6-triisocyanatotoluene, 1,3,5-triisocyanatobenzene, dianisidine diisocyanate, 4,4'-diphenyl ether diisocyanate, and 4,4',4"-triphenylmethane triisocyanate. Examples thereof further include polyisocyanates having an aromatic ring and having isocyanate groups not directly bonded to the aromatic ring. Specific examples thereof include p-tetramethylxylylene diisocyanate ($C_6H_4[C(CH_3)_2NCO]_2$) (hereinafter referred to as p-TMXDI) and m-tetramethylxylylene diisocyanate (hereinafter referred to as m-TMXDI).

Examples of the aliphatic polyisocyanate include trimethylene diisocyanate, tetramethylene diisocyanate, hexamethylene diisocyanate (hereinafter referred to as HDI), pentamethylene diisocyanate, 1,2-propylene diisocyanate, 2,3-butylene diisocyanate, 1,3-butylene diisocyanate, dodecamethylene diisocyanate, and 2,4,4-trimethylhexamethylene diisocyanate.

Examples of the alicyclic polyisocyanate include 3-isocyanatomethyl-3,5,5-trimethylcyclohexyl isocyanate (hereinafter referred to as IPDI), 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylenebis(cyclohexyl isocyanate), 1,4-bis(isocyanatomethyl)cyclohexane, 1,4-bis(isocyanatomethyl)cyclohexane, and norbornene diisocyanate.

These polyisocyanates may also be the trimethylolpropane adduct type modified products, biuret type modified products formed by reaction with water, or isocyanurate type modified products containing an isocyanurate ring, of the polyisocyanates shown above.

Preferred of the polyisocyanates shown above are one or more members selected from HDI, IPDI, MDI, 2,4-TDI, 2,6-TDI, p-TMXDI, m-TMXDI, and modified products thereof. In the case where the urethane resin to be obtained is for use in optical applications or in applications in which weatherability and light resistance are important, it is more preferred to use one or more polyisocyanates selected from the group consisting of aliphatic polyisocyanates, alicyclic polyisocyanates, and polyisocyanates having an aromatic ring and having isocyanate groups not directly bonded to the aromatic ring, which are non-yellowing type polyisocyanates. Especially preferred of these are one or more polyisocyanate compounds selected from the group consisting of HDI, IPDI, p-TMXDI, and m-TMXDI.

[Prepolymer Formation Reaction]

Methods for the prepolymer formation reaction are not particularly limited. Examples thereof include a method in which the polyol and the first polyisocyanate compound are introduced into a reactor optionally together with a urethane formation catalyst and a solvent and reacted.

In the invention, the polyol and the polyisocyanate compound are reacted in such a proportion that isocyanate groups are present in excess in order to obtain an isocyanate-group-terminated prepolymer. The polyol and the first polyisocyanate compound are mixed together in such a proportion (reacted in such a proportion) as to result in an index ((number of moles of NCO groups)/(number of moles of OH groups)×100) of preferably 110-300, more preferably 130-250, in order to enable isocyanate groups to remain at ends. In case where the index is smaller than 110, the reaction mixture tends to be apt to gel and increase in viscosity. In case where the index exceeds 300, the concentration of the unreacted isocyanate compound in the resultant prepolymer becomes too high and this tends to make the subsequent chain extension reaction difficult.

The isocyanate-group-terminated prepolymer has an isocyanate group content (NCO %) of preferably 0.5-12% by mass, more preferably 1-4% by mass, although the range of NCO % varies depending on the reactivity of the compound to be used and the amount of the chain extender to be added. In case where the NCO % is lower than 0.5% by mass, a chain extender cannot be reacted in a sufficient amount. In case where the NCO % exceeds 12% by mass, the chain extension reaction tends to become difficult to control.

Examples of the urethane formation catalyst to be used in the prepolymer formation reaction include known ones such as tertiary amine compounds and organometallic compounds.

Examples of the tertiary amine compounds include triethylamine, triethylenediamine, N,N-dimethylbenzylamine, N-methylmorpholine, and 1,8-diazabicyclo[5.4.0]undecene-7 (hereinafter referred to as DBU).

Examples of the organometallic compounds include tin compounds and non-tin compounds. Examples of the tin compounds include dibutyltin dichloride, dibutyltin oxide, dibutyltin dibromide, dibutyltin dimaleate, dibutyltin dilaurate (hereinafter referred to as DBTDL), dibutyltin diacetate, dibutyltin sulfide, tributyltin sulfide, tributyltin oxide, tributyltin acetate, triethyltin ethoxide, tributyltin ethoxide, dioctyltin oxide, tributyltin chloride, tributyltin trichloroacetate, and tin 2-ethylhexanoate. Examples of the non-tin compounds include titanium compounds such as dibutyltitanium dichloride, tetrabutyl titanate, and butoxytitanium trichloride, lead compounds such as lead oleate, lead 2-ethylhexanoate, lead benzoate, and lead naphthenate, iron compounds such as iron 2-ethylhexanonate and iron acetylacetonate, cobalt compounds such as cobalt benzoate and cobalt 2-ethylhexanoate, zinc compounds such as zinc naphthenate and zinc 2-ethylhexanoate, and zirconium naphthenate.

Preferred of the urethane formation catalysts shown above are DBTDL and tin 2-ethylhexanoate. Those urethane formation catalysts may be used singly or in combination of two or more thereof.

Examples of the solvent include aromatic hydrocarbons such as toluene and xylene, aliphatic hydrocarbons such as hexane, esters such as ethyl acetate and butyl acetate, ketones such as methyl ethyl ketone (MEK), and other compounds such as dimethylformamide and cyclohexanone. These may be used singly or in combination of two or more thereof.

The reaction is conducted at a temperature of preferably 120° C. or lower, more preferably 70-100° C. So long as the reaction temperature is 120° C. or lower, not only an isocyanate-group-terminated prepolymer having a desired molecular weight and a desired structure can be easily synthesized while inhibiting an allophanate formation reaction from proceeding, but also reaction rate can be easily controlled.

[Chain Extender]

The chain extender comprises a polyfunctional compound (X) having three or more functional groups reactive with an isocyanate group, wherein two of the functional groups of the polyfunctional compound (X) are primary hydroxyl groups and the remaining functional group(s) is secondary hydroxyl or tertiary hydroxyl group(s).

Examples of the polyfunctional compound (X) include compounds which are obtained by causing 1 mol of a compound selected from the group consisting of diethanolamine, triethanolamine, and trimethylolpropane to add 1 mol of an alkylene oxide having 3-4 carbon atoms and which have two primary hydroxyl groups and one secondary or tertiary hydroxyl group. Other examples thereof include compounds which are obtained by causing pentaerythritol to add 2 mol of an alkylene oxide having 3-4 carbon atoms and which have two primary hydroxyl groups and two secondary or tertiary hydroxyl groups. Examples of the alkylene oxides having 3-4 carbon atoms include propylene oxide, 1,2-butylene oxide, and 3,4-butylene oxide.

Examples of the polyfunctional compound (X) further include glycerol compounds such as glycerol (compound represented by chemical formula (2) wherein n=0), diglycerol, 1,2,4-butanetriol (compound represented by chemical formula (2) wherein n=1), and 1,2,5-pentanetriol (compound represented by chemical formula (2) wherein n=2) Examples of the polyfunctional compound (X) furthermore include mannitol, maltose, and sorbitol. The polyfunctional compound (X) has a molecular weight of preferably 500 or lower.

Of the polyfunctional compounds (X) shown above, the adducts of 1 mol of diethanolamine with 1 mol of an alkylene oxide having 3-4 carbon atoms (compounds represented by chemical formula (1)) and the glycerol compounds (compounds represented by chemical formula (2)) are preferred because these compounds are effective in inhibiting gelation and attaining a desired molecular weight.

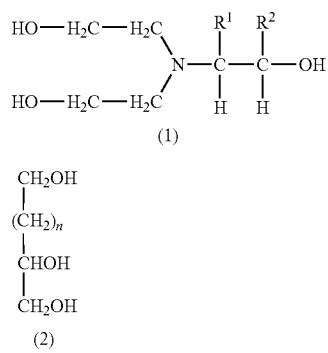

In chemical formula (1), $R^1$ represents a hydrogen atom or methyl group, and $R^2$ represents a methyl or ethyl group.

In chemical formula (2), n represents any of 0, 1, and 2.

Of the functional groups of the polyfunctional compound (X), the primary hydroxyl groups, which are highly reactive, readily react with the isocyanate groups of the isocyanate-group-terminated prepolymer. On the other hand, the secondary or tertiary hydroxyl groups, which are less reactive, hardly react with the isocyanate groups of the isocyanate-group-terminated prepolymer. It is thought that since the process for urethane resin production of the invention involves no catalysis attributable to amino groups, rapid gelation due to the reaction of the secondary hydroxyl groups or tertiary hydroxyl groups of the polyfunctional compound with the isocyanate groups of the isocyanate-group-terminated prepolymer during the chain extension reaction can be inhibited. Consequently, according to this process for urethane resin production, even when a non-yellowing type polyisocyanate compound in which the isocyanate groups have low reactivity is used as the polyisocyanate serving as a raw material for a prepolymer, rapid gelation is less apt to occur as compared with the case where a conventional chain extender having a primary amino group and a secondary amino group is used. The molecular weight of the prepolymer can hence be easily controlled by adding a chain terminator. Because of this, a pressure-sensitive adhesive suitable for optical applications can be obtained.

In the production process, since the chain extension reaction can be easily controlled, a sufficient amount of residual hydroxyl groups can be secured. Because of this, the cohesive force of the urethane-resin-based pressure-sensitive adhesive can be easily controlled by a crosslinker. Consequently, pressure-sensitive adhesiveness and removability may be both balanced.

[Other Chain Extenders]

A combination of the polyfunctional compound (X) and other polyfunctional compound(s) can be used as the chain extender in the invention. The other polyfunctional compounds are preferably compounds having a molecular weight of 500 or lower and having two or more functional groups reactive with an isocyanate group. Examples of the other polyfunctional compounds include diamine compounds such as isophoronediamine and ethylenediamine, diol compounds such as 1,4-butanediol, 1,6-hexanediol, and ethylene glycol, and alkanolamines such as monoethanolamine. A small amount of a triol compound may also be used in combination with the compound (X). The proportion of the other polyfunctional compounds is preferably up to 50% by mole, more preferably up to 20% by mole, of the chain extender.

[Chain Extension Reaction]

The chain extension reaction is not particularly limited. Examples of methods for the reaction include: (1) a method in which a solution of the isocyanate-group-terminated prepolymer is introduced into a reaction vessel and a chain extender is dropped into the reaction vessel and reacted; (2) a method in which a chain extender is introduced into a reaction vessel and a solution of the isocyanate-group-terminated prepolymer is dropped into the reaction vessel and reacted; and (3) a method in which a solution of the isocyanate-group-terminated prepolymer is diluted with a solvent and a given amount of a chain extender is introduced at a time into the reaction vessel and reacted. Of methods (1) to (3), method (1) or (3) is preferred because the concentration of isocyanate groups is gradually decreased and, hence, a homogeneous resin is easy to obtain.

The amount of the chain extender to be added varies depending on the NCO % (% by mass) of the isocyanate-group-terminated prepolymer. However, the chain extender may be used in such an amount that the isocyanate-group-terminated prepolymer, after the chain extension reaction, comes to have an NCO % of preferably 0.01-1.0%, more preferably 0.05-0.2%. So long as the chain extender is added in such an amount that the NCO % of the isocyanate-group-terminated prepolymer becomes 0.01% or higher, the reaction mixture can be more effectively prevented from rapidly increasing in viscosity to gel during the chain extension reaction. So long as the chain extender is added in such an amount that the NCO % of the isocyanate-group-terminated prepolymer becomes 1.0% or lower, the chain extension reaction proceeds sufficiently and a desired molecular weight is easy to obtain.

Because gelation is less apt to occur when the chain extender according to the invention is used, the chain extender may be added beforehand in an amount in excess of the isocyanate groups of the isocyanate-group-terminated prepolymer. So long as the chain extender is added in an amount in excess of the isocyanate groups of the isocyanate-group-terminated prepolymer, the ends of the urethane resin obtained can be hydroxyl groups.

The reaction temperature in the chain extension reaction is preferably 80° C. or lower. In case where the reaction temperature exceeds 80° C., the reaction rate becomes too high and it becomes difficult to control the reaction. Consequently, a urethane resin having a desired molecular weight and a desired structure tends to be difficult to obtain. When the chain extension reaction is conducted in the presence of a solvent, the reaction temperature is preferably not higher than the boiling point of the solvent. Especially when the reaction is conducted in the presence of MEK or ethyl acetate, the reaction temperature is preferably 40-60° C.

[Chain Terminator]

After the chain extension reaction, a chain terminator may be added according to need to conduct a termination reaction.

As the chain terminator, use can be made of a compound having only one functional group reactive with an isocyanate group or a compound having functional groups which are reactive with an isocyanate group and are one highly reactive functional group and one or two functional groups having lower reactivity than that functional group.

As the compound having only one functional group, use can be made of a compound having only one group selected from primary amino, secondary amino, primary hydroxyl, and secondary hydroxyl groups. Examples thereof include monoamine compounds such as diethylamine and morpholine and mono-ol compounds such as methanol.

Examples of the compound having functional groups which are reactive with an isocyanate group and are one highly reactive functional group and one or two functional groups having lower reactivity than that functional group include compounds having one primary amino or secondary amino group and further having one or two hydroxyl groups. Although such a compound has two or more functional groups, these functional groups differ in reactivity. Because of this, after the highly reactive functional group has reacted, the other functional groups remain unreacted. Consequently, this compound is substantially equal to monofunctional compounds. The hydroxyl groups are preferably secondary hydroxyl groups. Specifically, use can be made of monoamine compounds having a hydroxyl group, such as 2-amino-2-methyl-1-propanol (hereinafter referred to as "AMP"), monoisopropanolamine, and aminopropanol.

The chain terminator can be used according to need. The amount of the chain terminator to be added is preferably 1-2 mol per 1 mol of the terminal isocyanate groups remaining after the chain extension reaction. In case where the chain terminator is added in an amount smaller than 1 mol per 1 mol of the terminal isocyanate groups remaining after the chain extension reaction, the resultant urethane resin tends to be unstable because isocyanate groups remain after the termination reaction. On the other hand, in case where the chain terminator is added in an amount exceeding 2 mol per 1 mol of the terminal isocyanate groups remaining after the chain extension reaction, the amount of low-molecular weight compounds tends to increase.

In the case where the ends of the urethane resin are hydroxyl groups, there is no need of using a chain terminator.

The urethane resin thus obtained has a number-average molecular weight, as determined through measurement by GPC and calculation for standard polystyrene, of preferably 10,000 or higher. In the case where the urethane resin is to be formulated into a pressure-sensitive adhesive which is in a strong-tack region where the adhesive force exceeds 15 N/25 mm and which, despite this, has removability, the number-average molecular weight thereof is more preferably 30,000 or higher. In case where the number-average molecular weight of the urethane resin is lower than 10,000, pressure-sensitive adhesiveness, especially holding power, tends to decrease considerably. There is no particular upper limit on the molecular weight. However, the number-average molecular weight of the urethane resin is preferably 300,000 or lower because number-average molecular weights exceeding 300,000 result in the possibility of gelation.

[Solvent]

The chain termination reaction may be conducted in a solvent described above according to need.

[Additives]

The urethane resin may be used in combination with another resin such as, e.g., an acrylic resin, polyester resin, amino resin, or epoxy resin according to need. Additives also may be added thereto. Examples of the additives include fillers such as talc, calcium carbonate, and titanium oxide, tackifiers, colorants, ultraviolet absorbers, antioxidants, antifoamers, and light stabilizers.

The process for urethane resin production described above is a reaction process of an isocyanate-group terminated prepolymer and the specific chain extender. Of the functional groups of the chain extender to be used in the invention, the primary hydroxyl groups have high reactivity and the secondary and tertiary hydroxyl groups have low reactivity. Because of this, the two primary hydroxyl groups among the functional groups of the chain extender readily react with the isocyanate-group-terminated prepolymer during the chain extension reaction. On the other hand, the secondary or tertiary hydroxyl group, which has low reactivity, is less apt to react with the isocyanate-group-terminated prepolymer and is hence thought to remain in the urethane resin. A feature of the invention resides in that this chain extension reaction can be easily controlled. Even when the chain extender is used in combination with an isocyanate-group-terminated prepolymer obtained using, in particular, one or more polyisocyanates selected from the group consisting of aliphatic polyisocyanates, alicyclic polyisocyanates, and polyisocyanates having an aromatic ring and having isocyanate groups not directly bonded to the aromatic ring, then the chain extension reaction can be easily controlled and the urethane resin obtained can be inhibited from gelling and prevented from increasing in viscosity.

Furthermore, it is thought that since the functional groups remaining in the urethane resin can be used to crosslink the urethane resin, use of this urethane resin as a raw material can give a urethane-resin-based pressure-sensitive adhesive having excellent removability. In addition, since the chain extender to be used is an easily available one, the urethane resin is obtained at low cost.

(Pressure-Sensitive Adhesives)

The pressure-sensitive adhesives of the invention are explained below.

A pressure-sensitive adhesive of the invention includes a urethane resin obtained by the process for urethane resin production described above. The urethane resin itself obtained by the production process has pressure-sensitive adhesiveness and, hence, can be used as a pressure-sensitive adhesive by itself.

Alternatively, the urethane resin may be crosslinked with a second polyisocyanate compound, whereby a pressure-sensitive adhesive can be obtained. In this case, a pressure-sensitive adhesive is obtained which contains a crosslinked urethane resin obtained by reacting the hydroxyl groups remaining in the urethane resin obtained by the production process described above with the second polyisocyanate compound functioning as a crosslinker.

[Crosslinker]

As the second polyisocyanate compound functioning as a crosslinker, use is made of, e.g., polyfunctional polyisocyanates such as the first polyisocyanate compounds shown above and modified products thereof such as trimethylolpropane adduct type modified products, biuret type modified products, or isocyanurate type modified products. Preferred of these crosslinkers are modified products each having more than two functional groups on average. For example, use can be made of Duranate P301-75E (manufactured by Asahi Chemical Industry Co., Ltd.; trimethylolpropane adduct type HDI; isocyanate group content, 12.9% by mass; solid content, 75% by mass), Coronate L (manufactured by Nippon Polyurethane Co., Ltd.; trimethylolpropane adduct type TDI; isocyanate group content, 13.5% by mass; solid content, 75% by mass), or the like.

Similarly to the first polyisocyanate compound, the second polyisocyanate compound is preferably one or more polyisocyanates selected from the group of polyisocyanates excellent in weatherability and light resistance consisting of aliphatic polyisocyanates, alicyclic polyisocyanates, and polyisocyanates having an aromatic ring and having isocyanate groups not directly bonded to the aromatic ring, when the pressure-sensitive adhesive is for use in optical applications.

In the case where the pressure-sensitive adhesive is required to have removability, it is preferred that the second polyisocyanate compound should be one having an NCO % (excluding solvent in the case of solution) of 10-30% by mass and be reacted in an amount of up to 20 parts by mass per 100 parts by mass of the urethane resin. From the standpoint of better performance in removability, the amount of the second polyisocyanate compound to be reacted is more preferably 0.01-10 parts by mass. In contrast, nonuse of the second polyisocyanate compound results in a reduced cohesive force, and this pressure-sensitive adhesive is apt to suffer cohesive failures. In case where the amount of the second polyisocyanate compound exceeds 20 parts by mass, the resulting cohesive force is too high and this pressure-sensitive adhesive tends to have a reduced adhesive force.

The strength of the pressure-sensitive adhesive can be thus controlled by adjusting the amount of the second polyisocyanate compound to be used. Consequently, a pressure-sensitive adhesive having a well balanced combination of pressure-sensitive adhesiveness and strength can be easily obtained.

It is preferred that the second polyisocyanate compound should be added to and reacted with the urethane resin just before the pressure-sensitive adhesive is applied to an adherend.

A urethane formation catalyst can be used in reacting the crosslinker with the hydroxyl groups remaining in the urethane resin. As the urethane formation catalyst, use can be made of any of the urethane formation catalysts usable in the prepolymer formation reaction.

[Tack Regions]

As stated above, the pressure-sensitive adhesives of the invention are applicable to all of: a strong-tack region where the adhesive force is higher than 15 N/25 mm and not higher than 50 N/25 mm; a medium-tack region where the adhesive force is higher than 8 N/25 mm and not higher than 15 N/25 mm; a low-tack region where the adhesive force is higher than 1 N/25 mm and not higher than 8 N/25 mm; and a slight-tack region where the adhesive force is higher than 0 and not higher than 1 N/25 mm.

The adhesive force is measured by the following method. First, a pressure-sensitive adhesive layer having a thickness of 25 μm is formed on a 50-μm PET film to obtain a pressure-sensitive adhesive sheet. This pressure-sensitive adhesive sheet is cut into a width of 25 mm, and the resultant cut sheet is laminated on a stainless-steel plate having a thickness of 1.5 mm (SUS304 (JIS)) in an atmosphere having a temperature of 23° C. and a relative humidity of 65%. Subsequently, the cut sheet applied is press-bonded to the plate with a 2-kg rubber roll by the method in accordance with JIS Z 0237 (1991). After 30 minutes, the test piece is examined for adhesive force (180° peel; pulling rate, 300 mm/min) with the tensile tester as provided for in JIS B 7721.

The adhesive force of a pressure-sensitive adhesive of the invention can be controlled by adjusting the amount of the second polyisocyanate compound to be used.

The pressure-sensitive adhesives of the invention have the effect of being excellent in removability throughout the range of from the slight-tack region to the strong-tack region.

Because of this, when the urethane resin is formulated into a pressure-sensitive adhesive in the slight-tack region (slight-tack pressure-sensitive adhesive), this pressure-sensitive adhesive is usable as a protective tape for the surface protection of an optical film such as a polarizer, retardation film, or diffusing film in liquid-crystal displays. Protective tapes for the surface protection of optical films are required to be capable of being easily applied and removed and to be unsusceptible to surface pollution. In view of this, this pressure-sensitive adhesive of the invention, which can have both slight-tack pressure-sensitive adhesiveness and removability, is suitable.

In the case where the urethane resin is formulated into a pressure-sensitive adhesive in the low-tack region to the medium-tack region, this pressure-sensitive adhesive can be used for laminating various films equipped in liquid-crystal displays, etc. This pressure-sensitive adhesive is usable also as a pressure-sensitive adhesive for dicing tapes for fixing in silicon wafer cutting. In these applications, the pressure-sensitive adhesive is required to prevent the adherend from readily peeling off and to conform to film deformation. Because of this, this pressure-sensitive adhesive of the invention, which can have both low to medium adhesive force and removability, is suitable.

In the case where the urethane resin is formulated into a pressure-sensitive adhesive in the strong-tack region, this pressure-sensitive adhesive can be used in applications where considerable environmental changes occur, such as advertising signboards, automotive interior/exterior parts, and decorative steel sheets for home appliances, and in fields where resistance to wind pressure, contacts, etc. is required. Although adhesives have hitherto been used in such fields, the adhesives are required to have followability to external force and suitability for reapplication. In particular, the adhesives are required to attain stiff bonding and be thereafter capable of being removed without leaving an adhesive deposit from the standpoint of recycling. Consequently, this pressure-sensitive adhesive of the invention, which is of the strong-tack type and, despite this, has excellent removability, is effective.

Furthermore, the pressure-sensitive adhesives of the invention can be applied to adherends such as plastic films, plastic sheets, polyurethanes, paper, and polyurethane foams and advantageously used as tapes, labels, seals, decorative sheets, nonslip sheets, double-faced pressure-sensitive adhesive tapes, etc.

In the pressure-sensitive adhesives of the invention, the urethane resin is not in a gel state. Because of this, there is no need of reducing the solid concentration in order to reduce viscosity. Consequently, the pressure-sensitive adhesives of the invention can be applied thickly and can give coating films having high surface smoothness. Thus, the cushioning properties characteristics of urethanes can be imparted. In addition, the trouble of zipping, which is apt to occur in acrylic pressure-sensitive adhesives especially of the low-to slight-tack type, can be reduced.

EXAMPLES

The invention will be explained below in detail by reference to Examples thereof. However, the following Examples should not be construed as limiting the invention.

In the following Examples and Comparative Examples, the following polyols were used.

Polyol (P1): Polyoxypropylene diol having a hydroxyl value of 56.1 mg-KOH/g produced by reacting propylene oxide with propylene glycol as an initiator using KOH as a catalyst.

Polyol (P2): Polyoxypropylene diol having a hydroxyl value of 112 mg-KOH/g produced by reacting propylene oxide with propylene glycol as an initiator using KOH as a catalyst.

Example 1

Production of Urethane-Resin-Based Pressure-Sensitive Adhesive

Into a four-necked flask equipped with a stirrer, reflux condenser, nitrogen introduction tube, thermometer, and dropping funnel were introduced 177 g of polyol (P1), 23 g of 2,4-TDI (manufactured by Nippon Polyurethane Co., Ltd.; trade name Coronate T-100), and DBTDL as a urethane formation catalyst, the DBTDL being introduced in an amount corresponding to 25 ppm of the sum of the three components consisting of the polyol (P1), 2,4-tolylene diisocyanate, and glycerol (hereinafter abbreviated to GN). Subsequently, the mixture was gradually heated to 100° C., and a prepolymer formation reaction was conducted for 4 hours to obtain an isocyanate-group-terminated prepolymer. Thereafter, the resultant mixture was cooled to 60° C., and 115.3 g of ethyl acetate and 115.3 g of MEK were added thereto. Furthermore, 3.8 g of GN was added thereto as a chain extender and reacted. The reaction mixture was continuously reacted at 60° C. and, at the time when the NCO % had reached 0.02% or lower, 0.7 g of monoisopropanolamine (MIPA) was added thereto as a chain terminator to terminate the reaction. Thus, a urethane solution A was obtained which was colorless and transparent and had a solid content of 47% by mass.

The viscosity of this polyurethane solution was measured with a Brookfield viscometer and found to be 5,000 mPa·s/25° C. The number-average molecular weight of the resin in the polyurethane solution was determined through a measurement by gel permeation chromatography (GPC) and calculation for standard polystyrene, and was found to be 86,000.

Subsequently, 1.2 g of Coronate L (manufactured by Nippon Polyurethane Co., Ltd.; trimethylolpropane adduct type of TDI; isocyanate group content, 13.5% by mass; solid content, 75% by mass) was added as a crosslinker (second polyisocyanate compound) to 100 g of the polyurethane solution A obtained. The resultant mixture was stirred at 40 rpm for 1 minute to perform mixing. Thus, a urethane-resin-based pressure-sensitive adhesive $A_p$ was obtained.

Example 2

The same procedure as in Example 1 was conducted, except that the amounts of polyol (P1), 2,4-TDI, MEK, and ethyl acetate were changed as shown in Table 1 and that no urethane formation catalyst was used and 9.79 g of a compound obtained by the following production process (M1; adduct of diethanolamine with 1 mol of propylene oxide (DEA-PO)) was used as a chain extender. Thus, a polyurethane solution B was obtained. Furthermore, 1.5 g of Coronate L was added to 100 g of the polyurethane solution B obtained. Thus, a urethane-resin-based pressure-sensitive adhesive $B_p$ was obtained.

<Process for Producing Compound (M1)>

Into a reaction vessel which was a high-pressure autoclave having a capacity of 5 L was introduced 1,050 g (10 mol) of diethanolamine. The contents were heated to 110° C. in a nitrogen stream. Subsequently, 580 g (10 mol) of propylene oxide was introduced into the reaction vessel over 1 hour, and the mixture was further reacted at 110° C. for 2 hours. That no propylene oxide remained in the reaction vessel was ascertained by ascertaining that the decrease in the internal pressure of the reaction vessel had stopped. Thereafter, the reaction product was taken out of the reaction vessel. The reaction product obtained was examined for total amine value and tertiary-amine value and, as a result, the amine values each were found to be 344 mg-KOH/g. It was thus ascertained that no NH groups remained. The reaction product had a hydroxyl value of 1,033 mg-KOH/g and, hence, was ascertained to be diethanolmonopropanolamine. This reaction product was treated with trifluoroacetic acid and then analyzed by proton-NMR to determine the areas of the peak attributable to primary hydroxyl groups (around 5.3 ppm) and the peak attributable to secondary hydroxyl groups (around 4.6 ppm). It was thus ascertained that primary hydroxyl groups and secondary hydroxyl groups were present in a ratio of about 2:1. It was ascertained from these results that the reaction product was N,N-bis(2-hydroxyethyl)-N-(2-hydroxypropyl)amine $\{HO-CH(CH_3)CH_2-N-(CH_2CH_2OH)_2\}$. This compound is the compound represented by chemical formula (1) wherein $R^1$ is a hydrogen atom and $R^2$ is methyl.

Examples 3 to 8

Polyurethane solutions C to H were obtained under the same conditions as in Example 1, except for employing the formulation shown in Table 1. To each polyurethane solution was added the crosslinker (second polyisocyanate compound) shown in Table 1. Thus, urethane-resin-based pressure-sensitive adhesives $C_p$ to $H_p$ were obtained. In Examples 3 to 6 and 8, use was made of compound (M1), which was a diethanolamine adduct with 1 mol of PO, as a chain extender. In Example 7, glycerol was used as in Example 1.

TABLE 1

| | Example | | | | | | | |
|---|---|---|---|---|---|---|---|---|
| | 1 | 2 | 3 | 4 | 5 | 6 | 7 | 8 |
| Polyol (g) | | | | | | | | |
| Polyol (P1) | 177 | 221.2 | 710.3 | | | 257.2 | | |
| Polyol (P2) | | | | 150.1 | 150.1 | | 199.7 | 1318.9 |
| Isocyanate (g) | | | | | | | | |
| IPDI | | | | | | 42.8 | | 431.1 |
| HDI | | | 89.75 | 49.9 | 49.9 | | 50.3 | |
| TDI | 23 | 28.8 | | | | | | |
| Catalyst amount in prepolymer reaction (ppm) | 25 | | | | | | 25 | 25 |
| Chain extender (g) | | | | | | | | |
| Glycerol | 3.8 | | | | | | 9.5 | |
| M1 (DEA-PO) | | 9.79 | | | | | | |
| M2 (MXDA-PO) | | | 29.4 | 13.2 | 13.2 | 11.4 | | 101 |
| M3 (N2HEEDA) | | | | | | | | |
| Acrylic chain extender | | | | | | | | |
| Terminator (g) | | | | | | | | |
| MIPA | 0.7 | 0.6 | | | | | | 4.05 |
| AMP | | | | | | | | |
| Solvent (g) | | | | | | | | |
| Methyl ethyl ketone | 115.3 | 130.2 | 449.3 | 106.6 | 106.6 | 108.6 | 148.1 | |
| Ethyl acetate | 115.3 | 130.2 | 449.3 | 106.6 | 106.6 | 108.6 | 148.1 | 1018.9 |
| Toluene | | | | | | | | 1018.9 |
| Solid content (mass %) | 47 | 50 | 48 | 50 | 50 | 58 | 49 | 48 |
| Viscosity (mPa·s/25° C.) | 5000 | 5000 | 4400 | 5100 | 5100 | 4900 | 3700 | 5000 |
| Number-average molecular weight | 86000 | 40000 | 57000 | 87000 | 87000 | 52000 | 47500 | 30000 |
| Polyurethane solution | A | B | C | D | E | F | G | H |
| Crosslinker (g) | | | | | | | | |
| Duranate P301-75E | | | 1.2 | 1.1 | 3.5 | 1.9 | 1.4 | 2.1 |
| Coronate L | 1.2 | 1.5 | | | | | | |
| Catalyst amount in crosslinking reaction (ppm) | — | — | — | — | — | — | — | — |
| Number of moles of NCO/number of moles of OH (%) | 30 | 30 | 30 | 20 | 50 | 40 | 30 | 40 |
| Urethane-resin pressure-sensitive adhesive | $A_P$ | $B_P$ | $C_P$ | $D_P$ | $E_P$ | $F_P$ | $G_P$ | $H_P$ |

Comparative Example 1

In Comparative Example 1, an acrylic chain extender obtained by the following production process was used as a chain extender according to the formulation shown in Table 2 and the other components were used according to the formulation shown in Table 1. Thus, a polyurethane solution a was obtained. Furthermore, 1.0 g of Duranate P301-75E was added to 100 g of the polyurethane solution a obtained, and DBTDL was further added as a crosslinking reaction catalyst in an amount of 500 ppm of the polyurethane solution a. Thus, a urethane-resin-based pressure-sensitive adhesive $a_p$ was obtained.

<Process for Producing Acrylic Chain Extender>

The chain extender was obtained by subjecting 2.58 g of isophoronediamine, 1.94 g of butyl acrylate, and 2.19 g of 4-hydroxybutyl acrylate to the Michael addition reaction.

Comparative Examples 2 and 3

In Comparative Examples 2 and 3, N-(2-hydroxypropyl)-m-xylylenediamine (MXDA-PO; compound having primary amino, secondary amino, and secondary hydroxyl groups; compound (M2)) was used as a chain extender and the other components were used according to the formulation shown in Table 2. Thus, polyurethane solutions b and c were obtained. A urethane-resin-based pressure-sensitive adhesive $b_p$ was obtained by adding 0.8 g of Coronate L to 100 g of the polyurethane solution b obtained. Furthermore, a urethane-resin-based pressure-sensitive adhesive $c_p$ was obtained by adding 0.4 g of Coronate L to 100 g of the polyurethane solution c obtained.

Comparative Example 4

In Comparative Example 4, N-2-hydroxyethylethylenediamine (N2HEEDA; compound having primary amino, secondary amino, and primary hydroxyl groups; compound (M3)) was used as a chain extender and the other components were used according to the formulation shown in Table 2. Thus, a polyurethane solution d was obtained. A urethane-resin-based pressure-sensitive adhesive $d_p$ was obtained by adding 0.7 g of Duranate P301-75E to 100 g of the polyurethane solution d obtained.

Comparative Example 5

In Comparative Example 5, N-(2-hydroxypropyl)-m-xylylenediamine (M2) was used as a chain extender as in Comparative Examples 2 and 3 and the other components were used according to the formulation shown in Table 2 in order to obtain a polyurethane solution. However, the reaction mixture gelled.

which were obtained using a diethanolamine adduct with 1 mol of PO (M1) as a chain extender, had a low viscosity because the molecular weights of the specific urethane resins could be easily controlled.

In contrast, in Comparative Example 1, in which an acrylic chain extender was used, the pressure-sensitive adhesive had problems concerning strippability and skin irritation because acrylic compounds remained in the pressure-sensitive adhesive.

The polyurethane solutions b to d of Comparative Examples 2 to 4, which were obtained using a chain extender having amino groups, had a high viscosity. It was therefore necessary to lower the solid concentrations of these polyurethane solutions in order to handle these solutions under the same conditions as those for the polyurethane solutions of Examples 1 to 8. It was thus found that when the compound

TABLE 2

| | Comparative Example | | | | |
|---|---|---|---|---|---|
| | 1 | 2 | 3 | 4 | 5 |
| Polyol (g) | | | | | |
| Polyol (P1) | 107 | 206.1 | 206.1 | 284 | |
| Polyol (P2) | | | | | 159.8 |
| Isocyanate (g) | | | | | |
| IPDI | 17.9 | | | | |
| HDI | | | | 35.8 | 40.2 |
| TDI | | 34.57 | 34.57 | | |
| Catalyst amount in prepolymer reaction (ppm) | | | | | |
| Chain extender (g) | | | | | |
| Glycerol | | | | | |
| M1 (DEA-PO) | | | | | |
| M2 (MXDA-PO) | | 12.25 | 12.25 | | 14.8 |
| M3 (N2HEEDA) | | | | 5 | |
| Acrylic chain extender | 6.71 | | | | |
| Terminator (g) | | | | | |
| MIPA | | | | | |
| AMP | 1.7 | | | | |
| Solvent (g) | | | | | |
| Methyl ethyl ketone | 47.7 | 197.8 | 197.8 | 315.2 | 66.7 |
| Ethyl acetate | 47.7 | 197.8 | 197.8 | 320.1 | 66.7 |
| Toluene | 37.9 | | | 80 | |
| Solid content (mass %) | 40 | 39 | 39 | 34 | gelled |
| Viscosity (mPa · s/25° C.) | 5000 | 4000 | 4000 | 1700 | — |
| Number-average molecular weight | 25000 | 55000 | 55000 | 126000 | |
| Polyurethane solution | a | b | c | d | |
| Crosslinker (g) | | | | | |
| Duranate P301-75E | 1.0 | | | 0.7 | |
| Coronate L | | 0.8 | 0.4 | | |
| Catalyst amount in crosslinking reaction (ppm) | 500 | — | — | — | |
| Number of moles of NCO/number of moles of OH (%) | 20 | 40 | 20 | 20 | |
| Urethane-resin-based pressure-sensitive adhesive | $A_P$ | $B_P$ | $C_P$ | $D_P$ | |

The polyurethane solutions A and G of Examples 1 and 7, which were obtained using glycerol as a chain extender, and the urethane solutions B to F and H of Examples 2 to 6 and 8, having amino groups is used as a chain extender, the molecular weight of the urethane resin is difficult to control, resulting in a high viscosity.

(Property Evaluation)

Each of the urethane-resin-based pressure-sensitive adhesives $A_p$ to $H_p$ and $a_p$ to $d_p$ was applied to coat on a 50 μm-thick PET film in such an amount as to result in a dry thickness of 25 μm. The pressure-sensitive adhesive applied was dried at 100° C. for 2 minutes in a circulating oven to obtain a pressure-sensitive adhesive sheet. This pressure-sensitive adhesive sheet was aged at 23° C. for 1 week, subsequently allowed to stand for 2 hours at 23° C. and a relative humidity of 65%, and then examined for the following properties. The results of the evaluation are shown in Tables 3 and 4.

[Adhesive Force]: The pressure-sensitive adhesive sheet was applied at room temperature to a stainless-steel plate having a thickness of 1.5 mm (SUS304 (JIS) and press-bonded thereto with a 2-kg rubber roll. After 30 minutes, this test piece was examined for peel strength (180° peel; pulling rate, 300 mm/min) with the tensile tester as provided for in JIS B 7721.

[Ball Tack]: Measurement was made under the conditions of 23° C. and a relative humidity of 65% by the ball tack method as provided for in JIS Z 0237.

[Holding Power]: The pressure-sensitive adhesive sheet was applied to a stainless-steel plate having a thickness of 1.5 mm (SUS304 (JIS)) so that a 25 mm×25 mm area of the sheet was in contact with one end of the plate, and then press-bonded to the plate with a roll. Subsequently, the other end of the stainless-steel plate was held to dispose the resultant test piece so that the pressure-sensitive adhesive sheet hung from the stainless-steel plate. The test piece in this state was allowed to stand at 40° C. for 20 minutes. Thereafter, a load of 1 kg was imposed on the pressure-sensitive adhesive sheet, and the number of seconds required for the pressure-sensitive adhesive sheet to fall off or the distance over which the pressure-sensitive adhesive sheet shifted through 60 minutes was measured. Pressure-sensitive adhesive sheets which showed no shifting through the 60 minutes were rated as A (good), while those which fell off were rated as C (not good).

[Removability]: The pressure-sensitive adhesive sheet was applied to a stainless-steel plate (SUS304 (JIS)). Thereafter, this test piece was allowed to stand under the conditions of 40° C. and a relative humidity of 65% and cooled to 23° C. at a relative humidity of 65%. The pressure-sensitive adhesive sheet was then stripped off and the stainless-steel plate was visually evaluated for an adhesive deposit. In the visual evaluation, pressure-sensitive adhesive sheets which showed completely no adhesive migration to the stainless-steel plate were rated as A (good), those which showed partial adhesive migration were rated as B (fair), and those which had migrated completely were rated as C (not good). Furthermore, in the case where stripping resulted in an adhesive deposit on the stainless-steel plate, the proportion of the area of the adhesive deposit to the application area was calculated using equation (1) and evaluated.

Proportion of adhesive deposit (%)=[(area of pressure-sensitive adhesive migrated to stainless-steel plate)/(area where pressure-sensitive adhesive was applied)]×100    equation (1)

[State of stripping]: Pressure-sensitive adhesive sheets which were smoothly stripped off by hand were rated as A (good), those which caused slight zipping were rated as B (fair), and those which caused considerable zipping were rated as C (not good).

[Skin Irritation]: Pressure-sensitive adhesive sheets which did not contain any of acrylic monomers, acrylic resins, and the like at all were rated as A (good), while those containing any of such acrylic compounds even in a slight amount were rated as C (not good).

TABLE 3

| | Example | | | | | | | |
|---|---|---|---|---|---|---|---|---|
| | 1 | 2 | 3 | 4 | 5 | 6 | 7 | 8 |
| Urethane-resin-based pressure-sensitive adhesive | $A_P$ | $B_P$ | $C_P$ | $D_P$ | $E_P$ | $F_P$ | $G_P$ | $H_P$ |
| Adhesive force (N/25 mm) | 22 | 17 | 16 | 13 | 8 | 14 | 20 | 11 |
| Ball tack | 10 | 10 | 10 | 11 | 9 | 12 | 10 | 13 |
| Holding power | A | A | A | A | A | A | A | A |
| Removability | | | | | | | | |
| Visual evaluation | A | A | A | A | A | A | A | A |
| Proportion of adhesive deposit (%) | 0 | 0 | 0 | 0 | 0 | 0 | 0 | 0 |
| State of stripping | A | A | A | A | A | A | A | A |
| Skin irritation | A | A | A | A | A | A | A | A |

TABLE 4

| | Comparative Example | | | |
|---|---|---|---|---|
| | 1 | 2 | 3 | 4 |
| Urethane-resin-based pressure-sensitive adhesive | $a_P$ | $b_P$ | $c_P$ | $d_P$ |
| Adhesive force (N/25 mm) | 7 | 13 | 24 | 12 |
| Ball tack | 5 | 10 | 11 | 10 |
| Holding power | A | C | C | A |
| Removability | | | | |
| Visual evaluation | A | C | C | A |
| Proportion of adhesive deposit (%) | 0 | 50 | 90 | 0 |
| State of stripping | C | A | A | A |
| Skin irritation | C | A | A | A |

As Table 3 shows, the pressure-sensitive adhesives of Examples 1 to 7 each had the following pressure-sensitive adhesiveness. The pressure-sensitive adhesives of Examples 1 to 3 and 7 showed pressure-sensitive adhesiveness in the strong-tack region; the pressure-sensitive adhesives of Examples 4, 6, and 8 showed pressure-sensitive adhesiveness in the medium-tack region; and the pressure-sensitive adhesive of Example 5 showed pressure-sensitive adhesiveness in the low-tack region.

The pressure-sensitive adhesives of Examples 1 to 8 had excellent removability and satisfactory strippability and further showed low skin irritation. In addition, the pressure-sensitive adhesives of Examples 3 to 8 are prevented from yellowing because of the use of HDI or IPDI as a polyisocyanate compound, and are suitable for use in optical applications.

In contrast, the pressure-sensitive adhesive of Comparative Example 1, in which an acrylic chain extender was used, had poor strippability and showed high skin irritation as shown in Table 4.

Furthermore, the pressure-sensitive adhesives of Comparative Examples 2 and 3, in which a chain extender having two or more amino groups was used, showed no removability and had a low holding power.

(Applicability Evaluation)

Examples 9 to 11 and Comparative Examples 6 to 9 given below were evaluated for applicability. The evaluation is shown in Table 5.

[Smoothness Evaluation]: A pressure-sensitive adhesive was applied to a PET film with a blade type applicator having an application thickness of 1.75 MIL (1 MIL=25 mm) and dried to remove the solvent. Thereafter, the resin surface was visually evaluated for smoothness. Pressure-sensitive adhesives which gave a smooth surface were rated as A (good), and those which gave an uneven coating surface because of streaks or undulations were rated as C (not good).

ethyl acetate and MEK so as to result in a viscosity of 3,800-5,000 mPa·s was used in place of the polyurethane solution A and crosslinked with a crosslinker in the same manner as in Example 1. The pressure-sensitive adhesive $d_p''$ thus obtained was used.

TABLE 5

|  | Example | | | Comparative Example | | | |
| --- | --- | --- | --- | --- | --- | --- | --- |
|  | 9 | 10 | 11 | 6 | 7 | 8 | 9 |
| Polyurethane solution | A | B | H | b | b' | d' | d'' |
| Solid content (%) | 47 | 50 | 48 | 39 | 50 | 50 | 38 |
| Viscosity (mPa · s) | 5000 | 5000 | 5000 | 4000 | 12500 | 27000 | 4000 |
| Pressure-sensitive adhesive Applicability | $A_P$ | $B_P$ | $H_P$ | $b_P$ | $b_P'$ | $d_P'$ | $d_P''$ |
| Smoothness | A | A | A | A | C | C | A |
| Suitability for thick application | A | A | A | C | A | A | C |
| µm/MIL | 11.8 | 12.5 | 12.0 | 9.8 | 12.5 | 12.5 | 9.5 |

[Suitability for Thick Application]: A pressure-sensitive adhesive was applied to a PET film with a blade type applicator having an application thickness of 2.5 MIL to measure the coating thickness per MIL. Pressure-sensitive adhesives which gave a coating having a thickness per MIL of 10 µm or larger were rated as A (good), and those which gave a coating having a thickness per MIL smaller than 10 µm were rated as C (not good).

Examples 9 to 11

The pressure-sensitive adhesive $A_p$, pressure-sensitive adhesive $B_p$, and pressure-sensitive adhesive $H_p$ were used in Example 9, Example 10, and Example 11, respectively.

Comparative Example 6

The pressure-sensitive adhesive $b_p$ was used as it was.

Comparative Example 7

A polyurethane solution b' obtained by mixing the polyurethane solution b with a 1/1 (by mass) mixture solution of ethyl acetate and MEK so as to result in a solid content of 50% by mass was used in place of the polyurethane solution A and crosslinked with a crosslinker in the same manner as in Example 1. The pressure-sensitive adhesive $b_p'$ thus obtained was used.

Comparative Example 8

The solid content of the polyurethane solution d was adjusted to 50% by mass in the same manner as in Comparative Example 7. The resultant polyurethane solution d' was used in place of the polyurethane solution A and crosslinked with a crosslinker in the same manner as in Example 1. The pressure-sensitive adhesive $d_p'$ thus obtained was used.

Comparative Example 9

A polyurethane solution d'' obtained by mixing the polyurethane solution d with a 1/1 (by mass) mixture solution of As Table 5 shows, the pressure-sensitive adhesives of Examples 9 to 11 had a high solid content, were thickly applicable, and attained excellent smoothness.

In contrast, application of the pressure-sensitive adhesives of Comparative Examples 7 and 8 resulted in streaking defects concerning applicability. These pressure-sensitive adhesives had poor smoothness. The pressure-sensitive adhesives of Comparative Examples 6 and 9, in which the viscosity was controlled to 4,000 mPa·s from the standpoint of applicability, had poor suitability for thick application.

INDUSTRIAL APPLICABILITY

The urethane-resin-based pressure-sensitive adhesives of the invention are usable in applications such as protective films, pressure-sensitive adhesive tapes, pressure-sensitive adhesive labels, pressure-sensitive adhesive seals, nonslip sheets, and double-faced pressure-sensitive adhesive tapes for use in various fields including the electronic field, medical field, sports field, and building field.

Furthermore, a urethane-resin-based pressure-sensitive adhesive which is colorless and transparent and is in the medium-tack region can be produced in the invention by using a non-yellowing isocyanate as a polyisocyanate compound. The colorless and transparent, urethane-resin-based pressure-sensitive adhesive in the medium-tack region is usable in applications such as the laminating of a polarizer film or protective film for displays.

The entire contents of the description, claims, and abstract of Japanese Patent Application No. 2006-33907, filed on Feb. 10, 2006, are herein referred to and incorporated by reference and for disclosure of the invention.

While the invention has been described in detail and with reference to specific embodiments thereof, it will be apparent to one skilled in the art that various changes and modifications can be made therein without departing from the spirit and scope thereof.

The invention claimed is:

1. A process of producing a urethane resin removable pressure-sensitive adhesive having an adhesive force exceeding 15 N/25 mm and not higher than 50 N/25 mm, which process comprises:
   (1) reacting a polyol selected from the group consisting of polyoxyalkylene polyols, polyester polyols, polyoxytetramethylene glycol, and polycarbonate polyols and mixtures thereof, with one or more polyisocyanate compounds selected from the group consisting of aliphatic polyisocyanates, alicyclic polyisocyanates, and polyisocyanates having an aromatic ring and having isocyanate groups not directly bonded to the aromatic ring, in such a proportion that isocyanate groups are present in excess to thereby obtain an isocyanate-group-terminated prepolymer, (2) subsequently reacting the isocyanate-group-terminated prepolymer with a chain extender in an amount in such excess of the isocyanate groups of the isocyanate-group-terminated prepolymer that the urethane resin produced has residual hydroxyl groups and a number-average molecular weight of 10,000 to 300,000, and (3) further reacting the resultant polymer with a chain terminator having a group reactive with an isocyanate group in an amount of 1-2 moles per 1 mole of the terminal isocyanate groups remaining after the chain extension reaction;

wherein at least 50% by mole of the chain extender comprises a polyfunctional compound (X) having a molecular weight of 500 and lower and three or more functional groups reactive with an isocyanate group; wherein two of the functional groups of the polyfunctional compound (X) are primary hydroxyl groups and the remaining functional group(s) is secondary hydroxyl or tertiary hydroxyl group(s); and wherein the chain terminator is selected from the group consisting of (a) a compound having only one functional group reactive with an isocyanate group, and (b) a compound having one highly reactive functional group reactive with an isocyanate group and one or two less reactive functional groups, wherein the polyfunctional compound (X) is at least one member selected from the group consisting of compounds represented by chemical formula (1) and compounds represented by chemical formula (2):

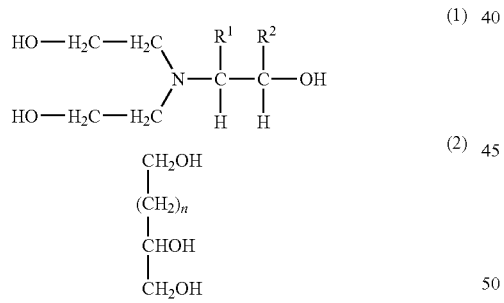

wherein R1 in chemical formula (1) represents a hydrogen atom or a methyl group and R2 therein represents a methyl group or an ethyl group; and n in chemical formula (2) represents any of 0, 1, and 2.

2. The process of claim 1, wherein polyol is selected from the group consisting of polyoxyalkylene polyols, polyoxytetramethylene glycol, polycarbonate polyols, and mixtures thereof.

3. The process of claim 1, wherein the polyol comprises a polyoxyalkylene polyol having an average number of hydroxyl groups of 2 or larger and having a hydroxyl value of 5.6-600 mg-KOH/g.

4. The process of claim 1, wherein the polyisocyanate compound is one or more polyisocyanate compounds selected from the group consisting of hexamethylene diisocyanate, 3-isocyanatomethyl-3,5,5-trimethylcyclohexyl isocyanate, p-tetramethylxylylene diisocyanate, and m-tetramethylxylylene diisocyanate.

5. A urethane resin removable pressure-sensitive adhesive obtained by the process of claim 1.

6. A removable pressure-sensitive adhesive which comprises a crosslinked urethane resin removable pressure-sensitive adhesive obtained by reacting a urethane resin removable pressure-sensitive adhesive obtained by the process of claim 1 with a second polyisocyanate compound.

7. The removable pressure-sensitive adhesive of claim 6, wherein the second polyisocyanate compound is one or more polyisocyanates selected from the group consisting of aliphatic polyisocyanates, alicyclic polyisocyanates, and polyisocyanates having an aromatic ring and having isocyanate groups not directly bonded to the aromatic ring.

8. The process of claim 1, wherein the polyfunctional compound (X) is at least one member selected from the group consisting of compounds represented by chemical formula (1):

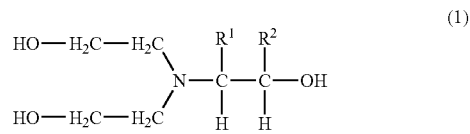

wherein $R^1$ in chemical formula (1) represents a hydrogen atom or a methyl group and $R^2$ therein represents a methyl group or an ethyl group.

9. The process of claim 1, wherein the polyfunctional compound (X) is at least one member selected from the group consisting of compounds represented by chemical formula (2):

wherein n in chemical formula (2) represents any of 0, 1, and 2.

10. The process of claim 1, wherein the polyfunctional compound (X) is at least one member selected from the group consisting of compounds represented by chemical formula (2):

wherein n in chemical formula (2) represents 1 or 2.

* * * * *